United States Patent [19]
Foster et al.

[11] Patent Number: 5,926,673
[45] Date of Patent: Jul. 20, 1999

[54] DRIVING MECHANISM FOR PHOTOSENSITIVE IMAGE BEARING DRUM IN ELECTROPHOTOGRAPHIC MACHINES

[75] Inventors: Mark Duane Foster; Donald Thomas Kral; James Caro Lurton; Kenneth Daniel Seevers; Tom E Stickler; Martin Joseph Zutt, Jr., all of Lexington, Ky.

[73] Assignee: Lexmark International, Inc., Lexington, Ky.

[21] Appl. No.: 09/152,998

[22] Filed: Sep. 14, 1998

[51] Int. Cl.⁶ ................................................... G03G 15/00
[52] U.S. Cl. .......................... 399/167; 399/117; 464/182
[58] Field of Search .................................... 399/167, 110, 399/111, 116, 117; 464/162, 179, 182

[56] References Cited

U.S. PATENT DOCUMENTS

| | | |
|---|---|---|
| 3,815,380 | 6/1974 | Esmay . |
| 4,535,645 | 8/1985 | De Bisschop et al. .................... 74/492 |
| 4,829,335 | 5/1989 | Kanemitsu et al. ..................... 355/211 |
| 4,922,297 | 5/1990 | Kondo . |
| 4,975,744 | 12/1990 | Ebata et al. .............................. 355/211 |
| 5,023,660 | 6/1991 | Ebata et al. .............................. 355/200 |
| 5,132,728 | 7/1992 | Suzaki et al. ............................ 355/200 |
| 5,371,576 | 12/1994 | Gonda ..................................... 355/211 |
| 5,608,498 | 3/1997 | Nagase et al. ........................... 399/130 |
| 5,669,046 | 9/1997 | Yoshida et al. .......................... 399/167 |
| 5,682,581 | 10/1997 | Honma et al. ............................ 399/167 |
| 5,758,243 | 5/1998 | Haneda et al. ........................... 399/298 |
| 5,848,334 | 12/1998 | Kamola .................................... 399/167 |
| 5,881,342 | 3/1999 | Makino et al. .......................... 399/167 |

FOREIGN PATENT DOCUMENTS

| | | | |
|---|---|---|---|
| 0 735 432 A1 | 10/1996 | European Pat. Off. | ....... G03G 15/00 |
| 0 797 125 A1 | 9/1997 | European Pat. Off. | ....... C03G 15/00 |
| 0 797 126 A1 | 9/1997 | European Pat. Off. | ....... G03G 15/00 |

Primary Examiner—Richard Moses
Attorney, Agent, or Firm—John A. Brady

[57] ABSTRACT

A supply cartridge including a photosensitive drum, a charge roller, a developer roller, and a supply of toner, is inserted into a conventional electrophotographic (EP) machine in operative association with the gear train for such machine. One end of a shaft passing through one end cap of the photosensitive drum is inserted into a receptacle in the EP machine. The free end of a drive transmitting member on the opposite end of the drum engages the drive train, and is driven by the gear train. The drive transmitting member is an integral part of a molded end cap inserted into the open end of the photosensitive drum. The drive transmitting member may assume diverse forms. The upper surface of the drive transmitting member may be triangular in shape, while the base may be circular or triangular; tapered sidewalls extend between the upper surface and the base, and the area of the upper surface exceeds the area of the base to maximize contact with the drive train. The drive transmitting member may assume the form of three, or more, spaced fingers, which approximate the apices of a triangle. The upper surface and the base of the drive transmitting member are in straight line alignment to facilitate molding procedures while maintaining tight tolerances.

13 Claims, 7 Drawing Sheets

DRIVING MECHANISM FOR PHOTOSENSITIVE IMAGE BEARING DRUM IN ELECTROPHOTOGRAPHIC MACHINES

FIELD OF THE INVENTION

The instant invention pertains generally to an image bearing member, such as a photosensitive drum used in an image forming process, and to the driving mechanism for rotating such member situated within a supply cartridge retained in an electrophotographic machine.

BACKGROUND OF THE INVENTION

Electrophotographic machines, such as laser printers, photocopiers, fax machines, etc., comprise a main assembly and a replaceable supply cartridge. The main assembly includes, inter alia, a housing, a control panel situated on the housing, an electronic control system, a motor, a gear train driven by the motor in response to the operation of the control panel, and electric contacts for delivering power to the supply cartridge inserted into, and retained within, grooves or channels in the opposed side walls of the housing. An optical projection system, which transmits images to the photosensitive drum, is located within the housing, and a central processor controls the sequence and timing of the mechanism operations.

The supply cartridge comprises a shell including, inter alia, a photosensitive drum, a charge roller for charging the photosensitive drum, a toner supply, and a developer roller for developing the latent image on the photosensitive drum. The rotational force imparted to the photosensitive drum is transmitted to each roller within the process cartridge. A latent image is transmitted by the optical projection system, in the machine housing, to the photosensitive drum, via a window or aperture in the cartridge. The storage member, usually paper, is retained in a cassette in the machine housing, and the advance of the paper through the machine is controlled by the gear train.

The electrographic (EP) machine includes a minimum number of moving parts, and is designed to function effectively for extended periods of time. The supply cartridge contains a limited supply of toner, and will be replaced numerous times over the life of the electrophotographic machine. The supply cartridge is configured to be readily removed, and accurately replaced, within the electrophotographic machine, with a minimum of effort, by office personnel.

One end of the photosensitive drum protrudes for connection to the gear train in the electrophotographic machine; the gear train imparts rotational force directly to the photosensitive drum and indirectly to the several associated drums, or rollers, within the supply cartridge.

An aperture is formed in one face of the gear train in the electrophotographic printer to receive the protruding end of the photosensitive drum. After the protruding end, or projection, of the photosensitive drum is properly seated in the gear train, the motor, when energized, supplies sufficient power to drive the gear train, the photosensitive drum, and the associated rollers within the supply cartridge.

An interface is defined between the supply cartridge by the protruding end of the photosensitive drum and the recess in the gear train of the electrophotographic machine. Such interface must be sturdy, and reliably, facilely and accurately established in the field, and provide for slip free power transmission to the cartridge and the several interconnected drums and rollers retained therein for the useful life of the cartridge. The interface must also be modest in cost, for price competition in the area of replacement supply cartridges is severe.

One technique for responding to the foregoing requirements is set forth in U.S. Pat. No. 5,023,660, granted Jun. 11, 1991, to Ebata et al. As shown in FIG. 4 of such patent, the image bearing member (photosensitive drum 1) includes a shaft receiving portion (central bore 2f), adjacent its center, to receive a positioning shaft (4) of the main assembly (of the photocopier), that correctly positions the image bearing member relative to the main assembly. Driving force is transmitted to the photosensitive drum by a drive transmission member (10) with projecting pins (10a) which engage ribs (2d) in the flange (2) formed in the protruding collar (2c) on the drum. The inner end of the metallic shaft contacts conductive plate (13) and establishes an electrical connection with the image bearing member for grounding same; a spring (12) normally urges the drive transmission member toward the photosensitive drum.

Another technique for transmitting driving force to the supply (or process) cartridge for an electrophotographic machine is disclosed in European patent application EP 0735 432 A1, published Oct. 2, 1996. Such technique employs a side gear (34) in the drive train (13) of the electrophotographic machine, such gear having recess (twisted hole 18a) formed in one face. A twisted, prism shaped projection (17a) extends outwardly from one end of the photosensitive drum within the supply (or process) cartridge (as shown in FIGS. 10 and 11). When the side gear is longitudinally advanced toward the twisted, prism-shaped projection, the projection enters the recess to establish a connection therebetween (as shown in FIGS. 13 and 14). The advancement of the side gear may be linked to the opening of cover (14) for the electrophotographic machine (note rod 37 in FIGS. 15–17).

Whereas the drive transmitting mechanisms described above functioned satisfactorily, certain shortcomings were noted. For example, the drive transmitting system described by Ebata et al requires a coil spring to maintain a constant biasing force upon the drive transmission element; such consistency is not easily maintained over extended periods of operation.

The European published patent application relies upon a twisted projection and a twisted hole for receiving same; the twisted projection is difficult and costly to mold within tight dimensional tolerances, and to remove same from a mold without injuring same.

SUMMARY OF THE INVENTION

The instant invention discloses a supply cartridge, of superior quality, that is compatible with known electrophotographic machines and is suitable for use as original equipment manufacture (OEM) and as an after-market replacement. Such supply cartridge employs a protruding member, at one side of the photosensitive drum, to fit within a recess in a side gear of the main gear train powered by the motor of the electrophotographic machine. A representative electro-photographic machine is shown in EP 0735,432 and the instant invention would function satisfactorily within such machine. shown in EP 075,732 and the instant invention would function satisfactorily within such machine.

An end cap is secured within an open end of the photosensitive drum; such end cap is a unitary plastic molding that is press-fit, adhesively joined, or otherwise secured to the drum. The end cap includes a laterally extending projection of unique shape. The top of the projection is substantially triangular in shape, and the base of the projection is usually annular, but may be triangular. The area of the base is smaller than the triangular area at the free end, or top, of the projection, so that the sidewalls of the projection connecting the base to the top of the projection taper outwardly. The geometry of the projection is selected so that each point about the base has a corresponding point on the triangular top, so that the tapered sidewalls are connected by straight, non-twisted lines. Thus the cross section of the drive member projection diminishes from the top to the base with the shortest distance between the same number of equally spaced points on the surface of the cross section each lying on a plane including the axis between the center of the top surface and the center of the base.

The geometry of the projection lends itself to accurate, straight line molding techniques that are capable of ready execution with simple molds. The resultant projection has increased area at its contact surface so that engagement within a recess in the main drive train is easily accomplished, without slippage, and is easily maintained.

Whereas the preferred embodiment of the projection is a solid member, the projection may assume other shapes, once again maintaining a smaller, base and a larger triangular shape at the contact surface. In alternative embodiments, three fingers, of either constant or changing thickness, are secured to the base; the three fingers are located at the apices of the triangular contact surface.

Other advantages attributable to the instant invention will become readily apparent to the skilled artisan, when the accompanying drawings are construed in harmony with the appended specification.

DESCRIPTION OF THE ILLUSTRATIVE EMBODIMENTS

Figure 1:
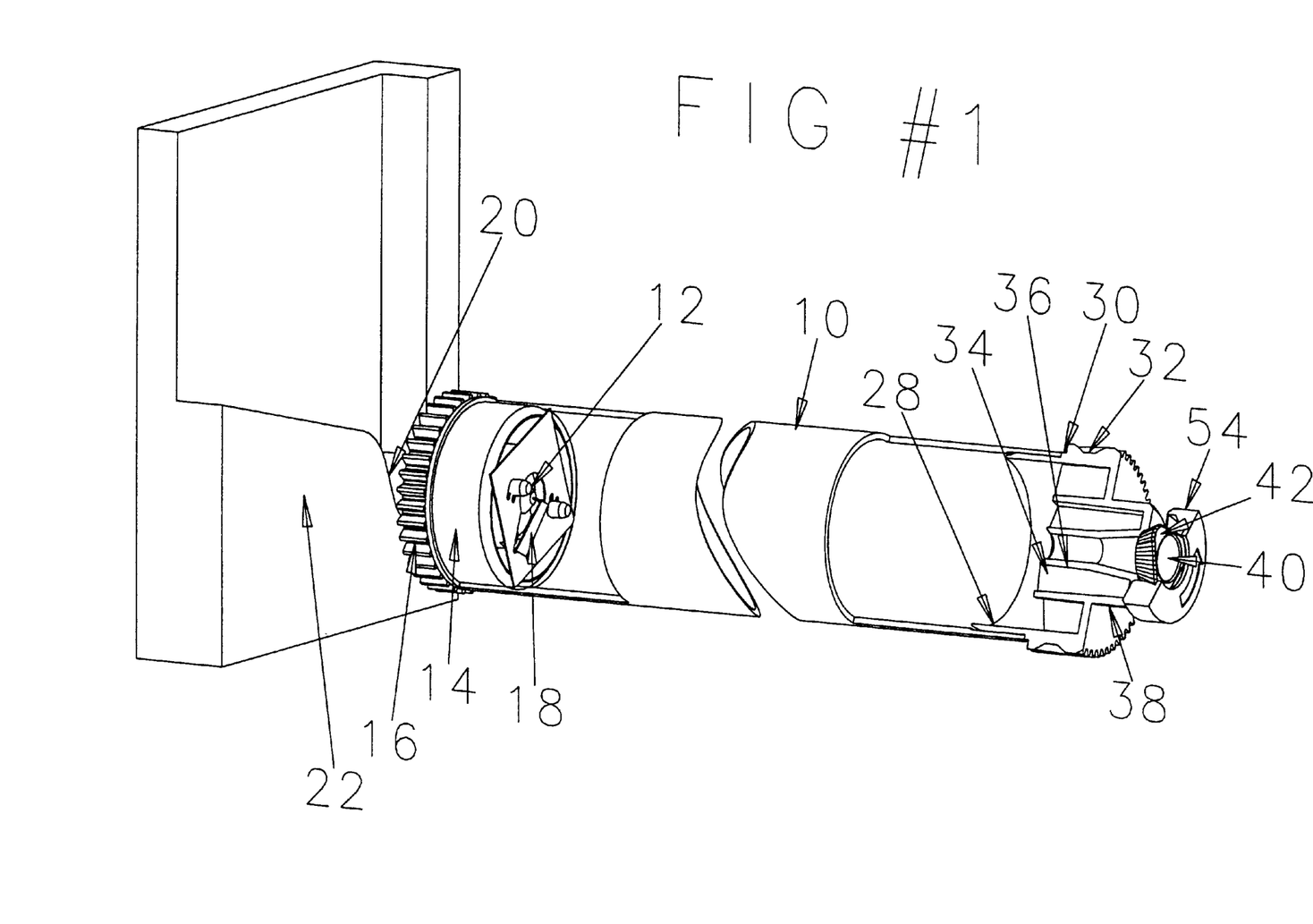
FIG. 1 is a perspective view of a photoconductive drum utilized in an electrophotographic printing apparatus, such drum including a drive transmission mechanism, at one end thereof, constructed in accordance with the principles of the present invention.
Figure 2:
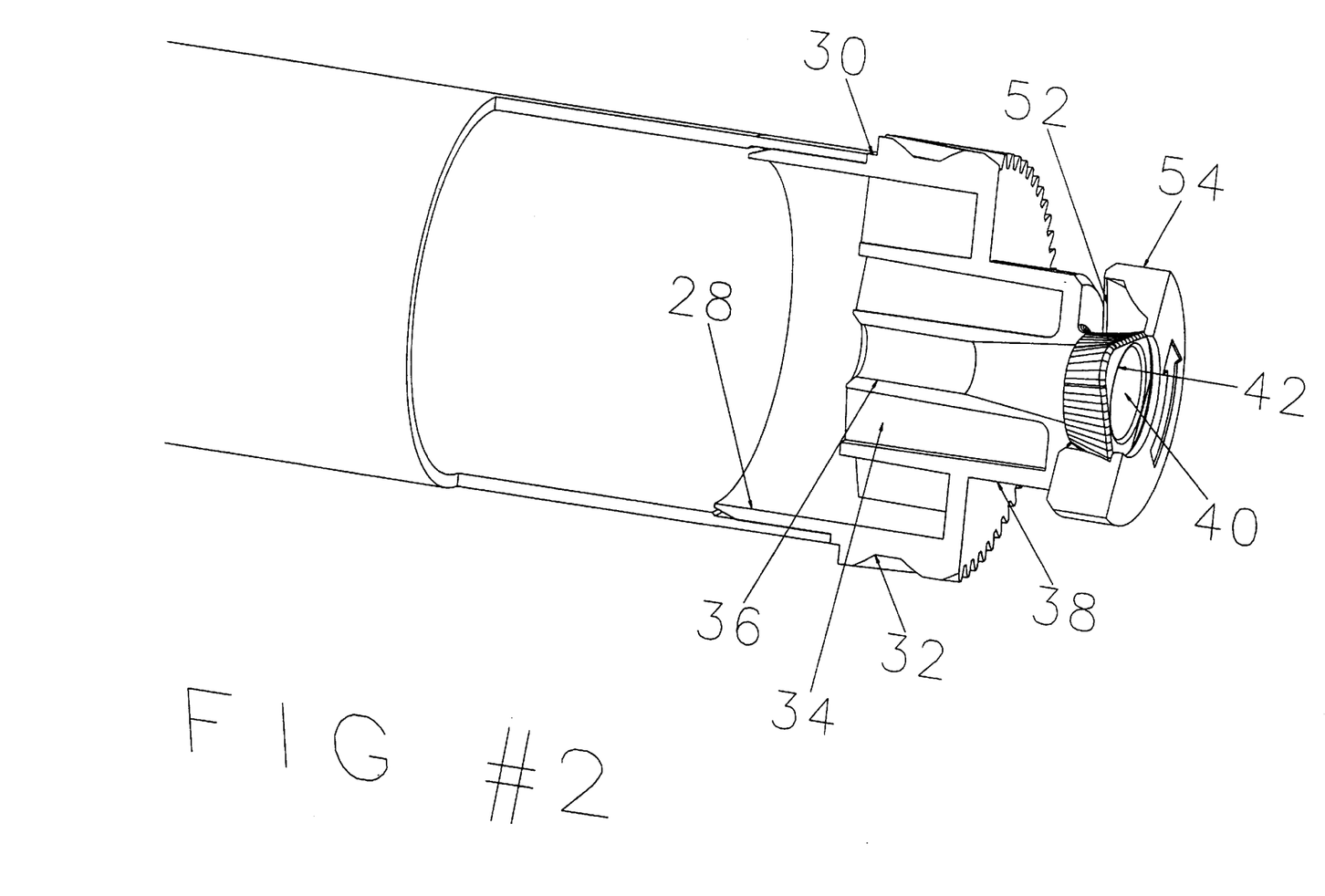
FIG. 2 is a perspective view, on an enlarged scale, of the drive transmission mechanism show in FIG. 1.
Figure 3:
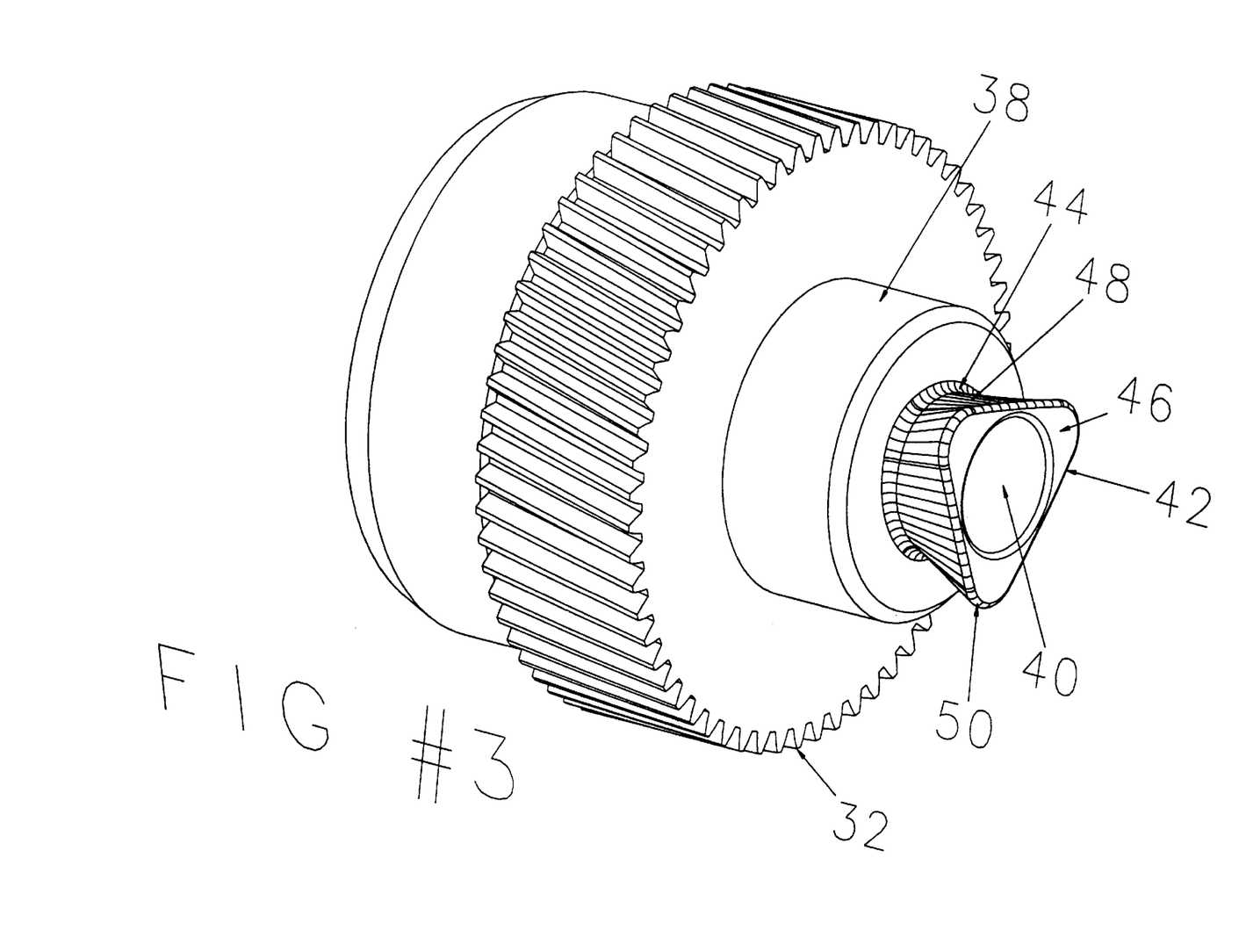
FIG. 3 is a perspective view, on a further enlarged scale, of the preferred drive transmission mechanism.

Referring now to the drawings, FIGS. 1–3 depict the preferred embodiment of the present invention. A photosensitive drum 10 extends between the side walls of the cartridge shell (not shown), and a shaft 12 extends axially through the auxiliary gear. Cut-away sections are shown at opposite ends of the drum to enhance clarity.

End cap 14 is secured within the remote end of drum 10 so that gear 16 abuts against the remote end of the drum. Contact 18 rests upon shaft 12 to maintain the ground contact for the photosensitive drum 10. One end of shaft 12 extends beyond end cap 14 and is received in U-shaped groove 20 in side wall 22 of a known electrophotographic (EP) apparatus. Only a fragment of side wall 22 is shown.

End cap 28, which is a unitary molded plastic component, is inserted into the open end of drum 10. Annular rib 30 abuts against the end of drum 10 to limit the extent of insertion and provide a secure seat for the end cap. End cap 28 is secured in fixed position within drum 10 by adhesives, staking, press-fitting, or other known techniques.

Helical gear 32 extends about the periphery of the end cap, and spokes 34 join hub 36 to gear 32. A central post 38 is aligned with shaft 12, and extends axially from end cap 28, and post 38 is hollow along its axial length and opens outwardly at aperture 40. Aperture 40 is formed during the molding process, when the core pin (not shown) is withdrawn.

Drive transmitting member 42 is located on post 38 and projects axially beyond helical gear 32. Drive transmitting member 42 comprises an annular base 44 (FIG. 3), a substantially triangular top 46, with sidewall 48 joining the base and top. Sidewall 48 is continuous and tapers gradually outwardly as member 42 increases in size. The edges of the top 46 are rounded at surface 50. Member 42 is shaped so that every interval, along the perimeter of top 46 can be joined by a straight line to a matching point around the periphery of base 44. (The pattern of connecting lines shown in FIG. 3 and FIG. 1 are imaginary lines shown to illustrate the straight connection, each of the lines being on the same plane as the axis between the center of top 46 and the center of base 44. The geometry of member 42 lends itself to simplified, straight line molding techniques with tight manufacturing tolerances.

When photosensitive drum 10 is shifted axially, or longitudinally, the free end of drive transmitting member 42 fits into a recess 52 (FIG. 1) in a lateral face of gear 54 positioned inboard of side wall 56 of the electrophotographic machine. A second gear (not shown) in the electrophotographic machine engages gear 54 when motor (not shown) in the electrophotographic machine is energized, so that the second gear rotates gear 54, and drum 10, via member 42 received, and retained, in recess 52. When drive gear 54 rotates, drum 10, via member 42, is received and retained in recess 52, being rotated and being positioned both radially and axially.

FIG. 3 shows the preferred embodiment of the drive transmitting member in a non-cut-away illustration. Drive transmitting member 42 comprises a triangular top surface 46, an annular base 44, and a slightly tapered sidewall 48. Rounded surface 50 provides a transition between upper surface 46 and sidewall 48. Drive transmitting member 42 is molded with a central aperture 40 defined by a hollow post 36 (FIG. 2). The surface area of the top 46 of member 42 (including aperture 40) exceeds the area on base 44 of member 42. An enlarged cylindrical base 38 (FIG. 2) extends axially from the outer surface of helical gear 32. The helical gear encircles the end cap 28, including member 42.

Figure 4:
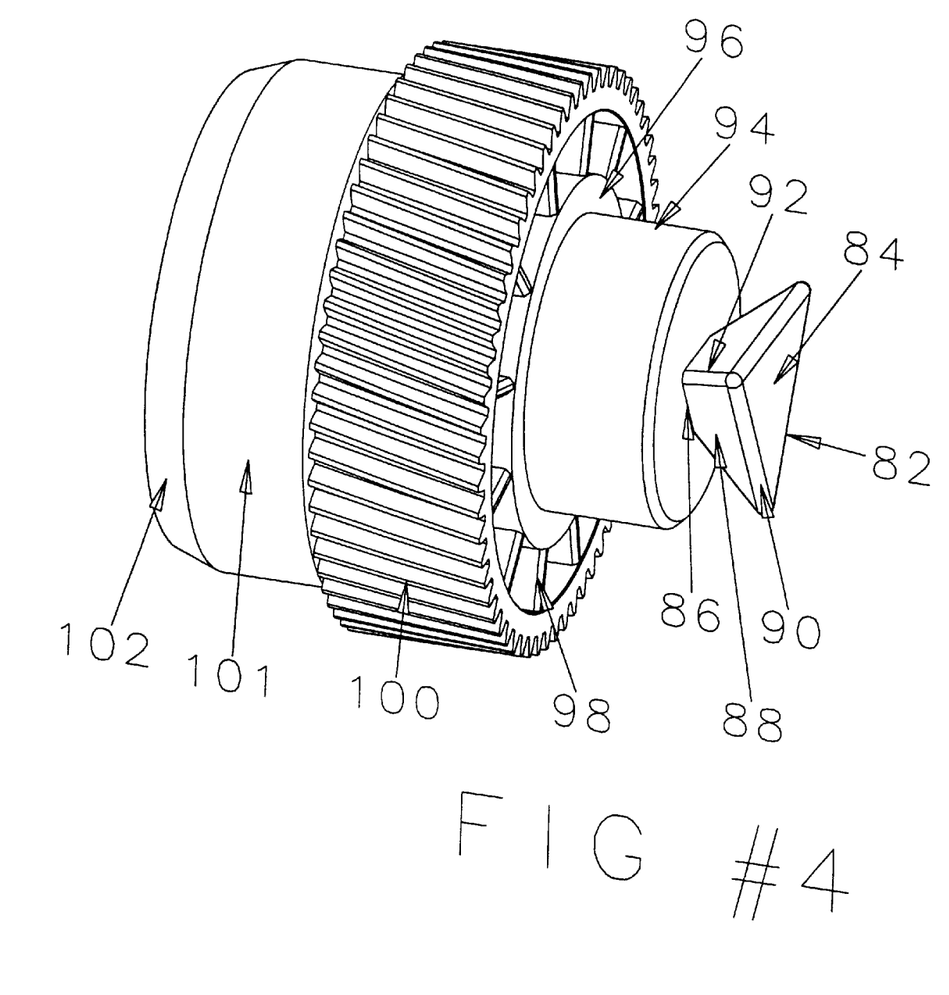
FIG. 4 is a perspective view, on an enlarged scale, of a second, alternative drive transmission mechanism.

FIG. 4 depicts a second alternative embodiment of the drive transmitting member; such embodiment is indicated by reference numeral 82. Drive transmitting member 82 includes an upper surface 84 of triangular shape, and a base 86, also of triangular shape, but of lesser area. Sidewall 88 tapers outwardly to join the base to the upper surface of member 82. Rounded segments 90 form a transition between is upper surface 84 and sidewall 88, while rounded segment 92 forms a transition between adjacent sections of sidewall 88.

Drive transmitting member 82 is mounted atop cylindrical support, or boss, 94 and central post 96. Spokes 98 extend radially between post 96 and helical gear 100, and flange 101 projects longitudinally beyond gear 100. Tapered edge 102 facilitates insertion of the end cap, including drive transmitting member 82, into the open end of a photosensitive drum.

Figure 5:
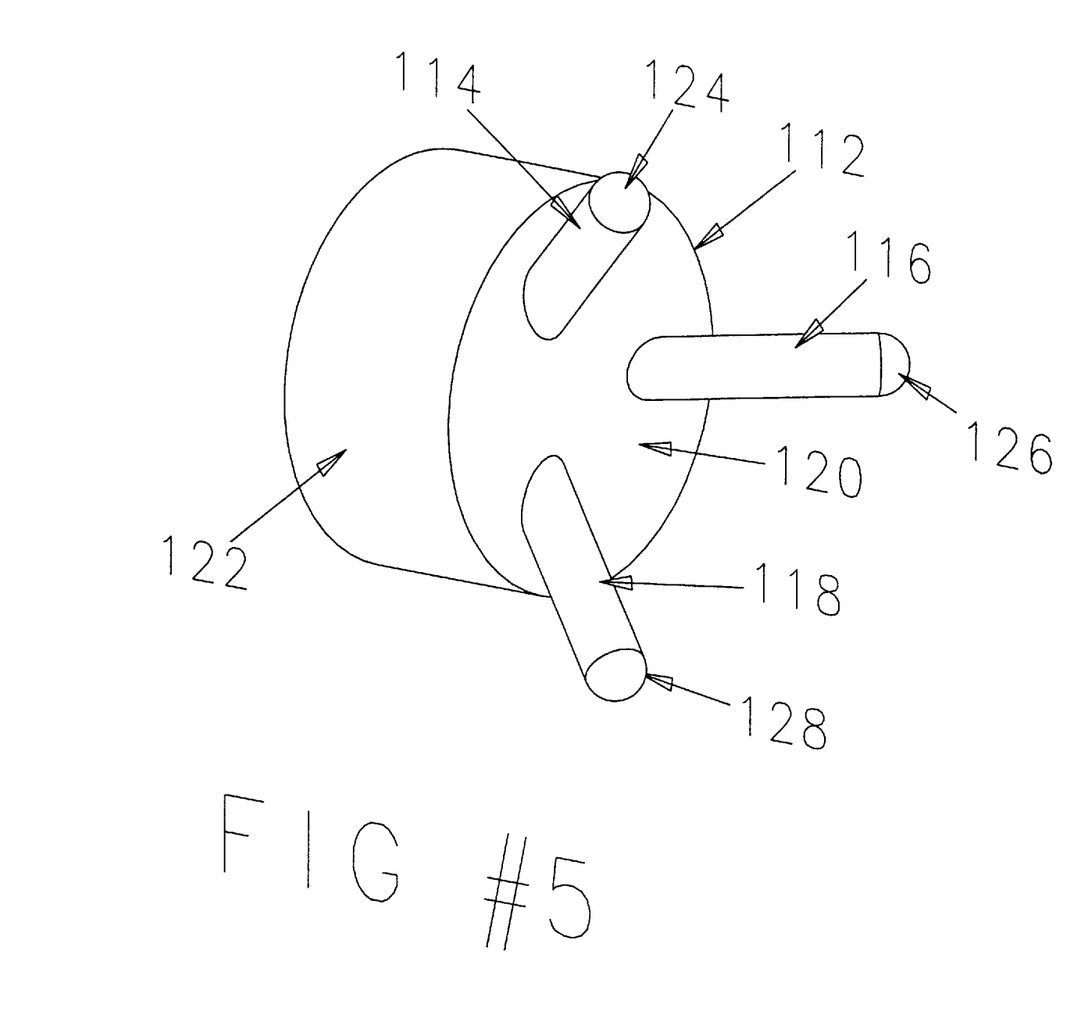
FIG. 5 is a perspective view of a third, alternative drive transmission mechanism.

FIG. 5 depicts another alternative embodiment of the drive transmitting member; such embodiment is indicated generally by reference numeral 112. Three spaced fingers 114, 116, and 118 extend upwardly, and outwardly, from base 120. Cylindrical section 122 completes base 120. The upper ends of the fingers suggest the apices of a triangle and the outward taper of the fingers suggests a tapered sidewall. Rounded surfaces 124, 126, and 128 are defined at the outer ends of the fingers. The fingers possess uniform thickness, and are cylindrical in shape.

Figure 6:
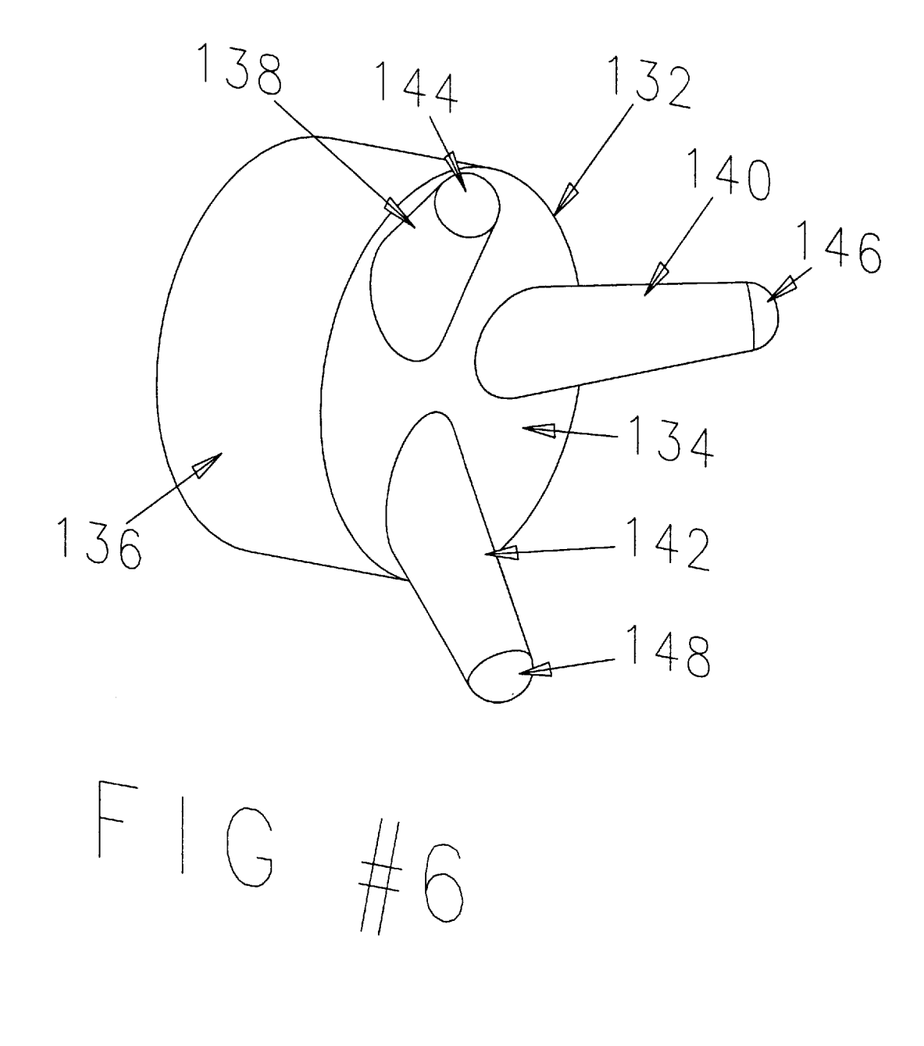
FIG. 6 is a perspective view of a fourth, alternative drive transmission mechanism.

FIG. 6 depicts another embodiment of the drive transmitting member; such member is identified generally by reference numeral 132. Member 132 comprises base 134, cylindrical section 136, and upwardly projecting fingers 138, 140 and 142. The fingers are generally conical in shape, and project outwardly beyond base 134; the free ends of fingers 138, 140 and 142 may be considered to be apices of a triangle that is greater in area than the supporting base. Rounded surfaces 144, 146, and 148 are formed at the free ends of the fingers.

Figure 7:
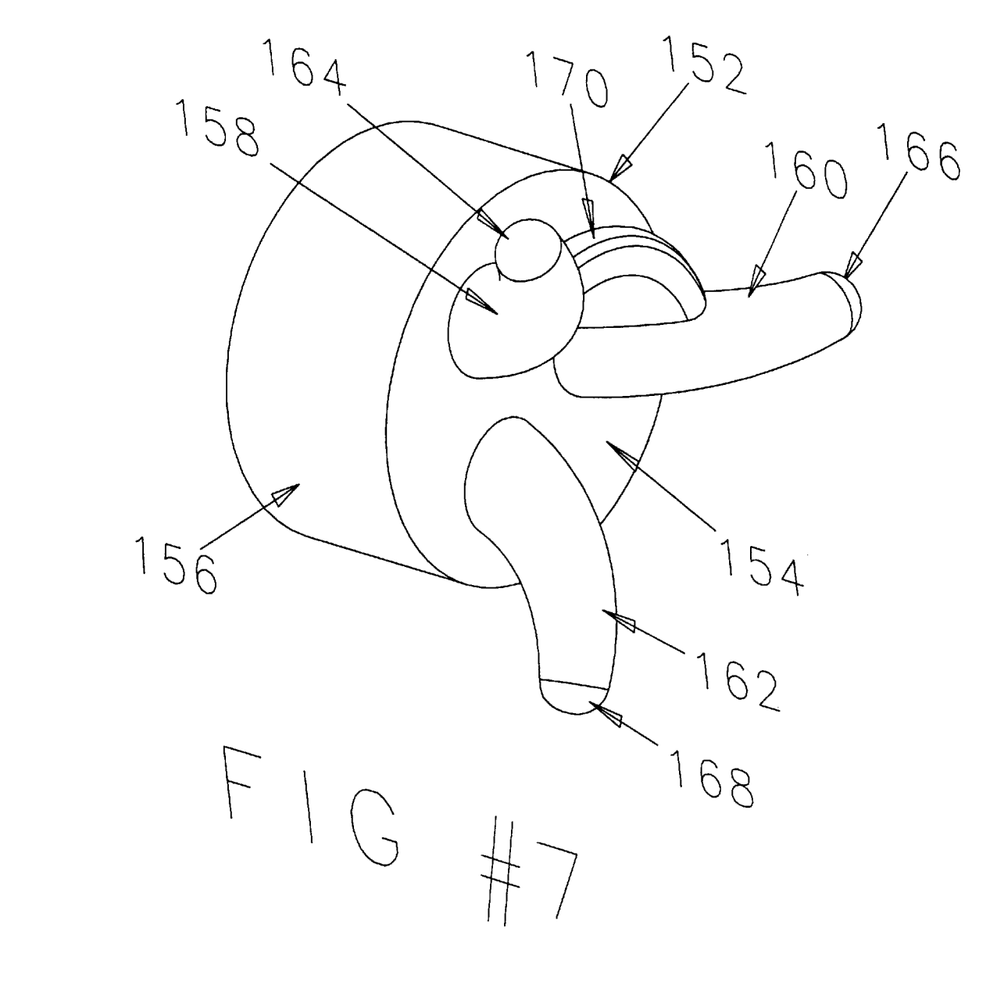
FIG. 7 is a perspective view of a fifth, alternative drive transmission mechanism.

FIG. 7 depicts yet another embodiment of the drive transmitting member; such member is identified generally by reference numeral 152. Member 152 comprises base 154, cylindrical section 156, and upwardly projecting fingers 158, 160, and 162. The fingers are of variable cross-section and curve outwardly, with the greatest cross-sectional area being present closest to base 154. Rounded surfaces 164, 166, and 168 are formed at the free ends of the fingers. Webbing 170 may interconnect and strengthen some, or all, of the fingers.

The embodiment of FIG. 7 varies from the other embodiments in that it has some curvature along its cross section. However, this curvature defines imaginary lines which remain in one plane which includes the axis between the center of the top surface formed by fingers 158, 160, and 162 and the center of their bottom surface. The other embodiments have the advantage of being more linear and therefore, easier to manufacture. In the other embodiment, the cross section of the drive member projection diminishes from the top to the base with the shortest distance between the same number of equally spaced points on the surface of the cross section, each lying on a straight line extending from the top surface to the base.

Numerous other modification and revisions will occur to the skilled artisan in the relevant areas of technology. For example, the shaft for the photosensitive drum may extend entirely through the drum; other shapes for the fingers in the embodiments of FIGS. 5–7 may also be feasible. Consequently, the appended claims should be broadly construed in a manner consistent with the significant advances in the useful arts and sciences set forth in the present application, and should not be limited to their literal terms.

We claim:

1. A photosensitive drum comprising
   a first open end and a second open end,
   means secured within said first end for supporting said drum,
   an end cap secured within said second end, and
   a drive transmitting member projecting longitudinally from said end cap beyond said drum,
   said drive member being adapted to receive rotative force from an external source to cause said drum to rotate,
   said drive member comprising a top surface, a base, and tapered sidewalls connecting said top surface and said base,
   said top surface defining greater area than said base,
   the surface connecting said top surface to said base defining lines lying in one plane which includes the axis between the center of said top surface and the center of said bottom surface.

2. A drum as defined in claim 1 wherein said top surface of said drive member is triangular in shape.

3. A drum as defined in claim 2 wherein said base of said drive member is circular in shape.

4. A drum as defined in claim 1 wherein said drive transmitting member is formed with an integral central post.

5. A drum as defined in claim 4 wherein said post is a hollow cylindrical member.

6. A drum as defined in claim 1 wherein said drive member is formed by three fingers having outward curvature.

7. A drum comprising
   a first open end and a second open end,
   means secured within said first end for supporting said drum,
   an end cap secured within said second end, and
   a drive transmitting member projecting longitudinally from said end cap beyond said drum,
   said drive member being adapted to receive rotative force from an external source to cause said drum to rotate,
   said drive member being characterized by a top surface, a base, and tapered sidewalls connecting said top surface and said base,
   said top surface defining greater area than said base,
   the cross section of said drive member diminishing from said top surface to said base with the shortest distance between the same number of equally spaced points on the surface of the cross section each lying on a straight line extending from said top surface to said base.

8. A drum as defined in claim 7 wherein said top surface is triangular in shape.

9. A drum as defined in claim 8 wherein said base is circular in shape.

10. A drum as defined in claim 7 wherein said drive transmitting member is integrally formed with a central post.

11. A drum as defined in claim 10 wherein said post is a hollow cylindrical member.

12. A drum as defined in claim 7 wherein said drive member is formed by three straight fingers.

13. The drum as defined in claim 12 wherein said fingers are larger at said base than at said top.

* * * * *